United States Patent
Kawano et al.

(10) Patent No.: US 9,130,386 B2
(45) Date of Patent: Sep. 8, 2015

(54) WIRELESS POWER TRANSMITTING DEVICE AND WIRELESS POWER TRANSMISSION SYSTEM HAVING A VARIABLE DISTANCE BETWEEN A FEEDING SURFACE AND A POWER TRANSMITTING COIL

(75) Inventors: Hiroyasu Kawano, Kawasaki (JP); Kiyoto Matsui, Kawasaki (JP); Masakazu Taguchi, Kawasaki (JP); Satoshi Shimokawa, Kawasaki (JP); Akiyoshi Uchida, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 697 days.

(21) Appl. No.: 13/357,905

(22) Filed: Jan. 25, 2012

(65) Prior Publication Data

US 2012/0212069 A1 Aug. 23, 2012

(30) Foreign Application Priority Data

Feb. 17, 2011 (JP) .................. 2011-032366

(51) Int. Cl.
  *H02J 17/00* (2006.01)
  *H02J 5/00* (2006.01)
  *H01F 38/14* (2006.01)
(52) U.S. Cl.
  CPC ............... *H02J 5/005* (2013.01); *H01F 38/14* (2013.01); *H02J 17/00* (2013.01)
(58) Field of Classification Search
  None
  See application file for complete search history.

(56) References Cited

U.S. PATENT DOCUMENTS

| | | | |
|---|---|---|---|
| 7,450,910 B2 | 11/2008 | Aoki | |
| 8,169,185 B2* | 5/2012 | Partovi et al. | 320/108 |
| 8,461,800 B2* | 6/2013 | Kozakai | 320/108 |
| 2009/0102419 A1 | 4/2009 | Gwon et al. | |
| 2009/0179502 A1* | 7/2009 | Cook et al. | 307/104 |
| 2010/0213895 A1* | 8/2010 | Keating et al. | 320/108 |
| 2010/0244839 A1 | 9/2010 | Yoshikawa | |
| 2010/0253153 A1 | 10/2010 | Kondo et al. | |
| 2011/0018496 A1 | 1/2011 | Kozakai | |
| 2013/0257369 A1* | 10/2013 | Nazaroff et al. | 320/108 |

FOREIGN PATENT DOCUMENTS

| | | |
|---|---|---|
| JP | 2005-110399 | 4/2005 |
| JP | 2009-504115 | 1/2009 |
| JP | 2010-098896 | 4/2010 |
| JP | 2010-193701 | 9/2010 |
| JP | 2010-239838 | 10/2010 |
| JP | 2010-245323 | 10/2010 |

(Continued)

OTHER PUBLICATIONS

Japanese Notification of Reasons for Refusal dated Jul. 1, 2014 in Japanese Application No. 2011-032366.

*Primary Examiner* — Rexford Barnie
*Assistant Examiner* — David Shiao
(74) *Attorney, Agent, or Firm* — Staas & Halsey LLP

(57) ABSTRACT

A wireless power transmitting device includes a housing configured to have a feeding surface on which a power receiving device is to be placed; a power transmitting coil disposed inside the housing and configured to have a central axis that intersects with the feeding surface; and an alternating-current power supply configured to supply power to the power transmitting coil, wherein the feeding surface has raised and recessed portions in an area corresponding to a region inside an outer region of the power transmitting coil.

13 Claims, 34 Drawing Sheets

(56) References Cited

FOREIGN PATENT DOCUMENTS

| JP | 2010-259171 | 11/2010 |
| JP | 2011-010435 | 1/2011 |
| JP | 2011-030318 | 2/2011 |
| WO | WO 2010/122389 | 10/2010 |

* cited by examiner

WIRELESS POWER TRANSMITTING DEVICE AND WIRELESS POWER TRANSMISSION SYSTEM HAVING A VARIABLE DISTANCE BETWEEN A FEEDING SURFACE AND A POWER TRANSMITTING COIL

CROSS-REFERENCE TO RELATED APPLICATION

This application is based upon and claims the benefit of priority of the prior Japanese Patent Application No. 2011-32366, filed on Feb. 17, 2011, the entire contents of which are incorporated herein by reference.

FIELD

The embodiments discussed herein are related to a wireless power transmitting device and a wireless power transmission system that use magnetic field resonance.

BACKGROUND

In recent years, there have been an increasing number of portable electronic devices equipped with rechargeable batteries, such as mobile phones and music players. At the same time, power transmission techniques have been developed to wirelessly supply power to such electronic devices.

The wireless power transmission techniques are of two types: an electromagnetic induction type using electromagnetic induction and a magnetic field resonance type using magnetic field resonance. The electromagnetic induction type involves power transmission in which a magnetic flux produced by a coil of a power transmitting device is received by a power receiving device. In the wireless power transmission of electromagnetic induction type, the power transmission efficiency is significantly influenced by a distance between the coil of the power transmitting device and the coil of the power receiving device. Specifically, the power transmission efficiency decreases significantly with increasing distance between the coil of the power transmitting device and the coil of the power receiving device.

On the other hand, the magnetic field resonance type involves use of a power transmitting device and a power receiving device each having a resonant circuit formed by a coil and a capacitor. Here, power is transmitted from the power transmitting device to the power receiving device by making resonance frequencies of the two resonant circuits equal. The wireless power transmission of magnetic field resonance type is advantageous in that even if there is some distance between the power transmitting device and the power receiving device, power may be transmitted with high efficiency. These related arts are disclosed, for example, in Japanese National Publication of International Patent Application No. 2009-504115, Japanese Laid-Open Patent Publication No. 2010-193701, Japanese Laid-Open Patent Publication No. 2010-98896, and Japanese Laid-Open Patent Publication No. 2005-110399.

SUMMARY

According to an aspect of the invention, a wireless power transmitting device includes a housing configured to have a feeding surface on which a power receiving device is to be placed; a power transmitting coil disposed inside the housing and configured to have a central axis that intersects with the feeding surface; and an alternating-current power supply configured to supply power to the power transmitting coil, wherein the feeding surface has raised and recessed portions in an area corresponding to a region inside an outer region of the power transmitting coil.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

An object of the present embodiments is to provide a wireless power transmitting device and a wireless power transmission system that may suppress heat generation in and damage to a power receiving device caused by excessive supply of power.

Before description of embodiments, preliminary matters will be discussed here for ease of understanding the embodiments.

Figure 1:
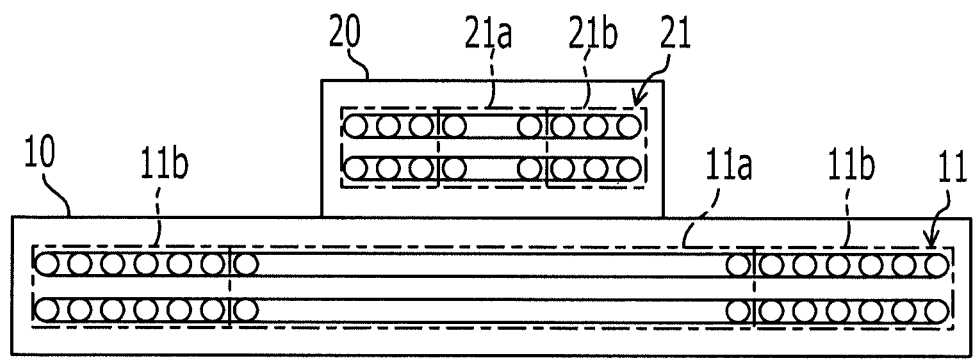
FIG. 1 schematically illustrates a wireless power transmission system of magnetic field resonance type.
Figure 2:
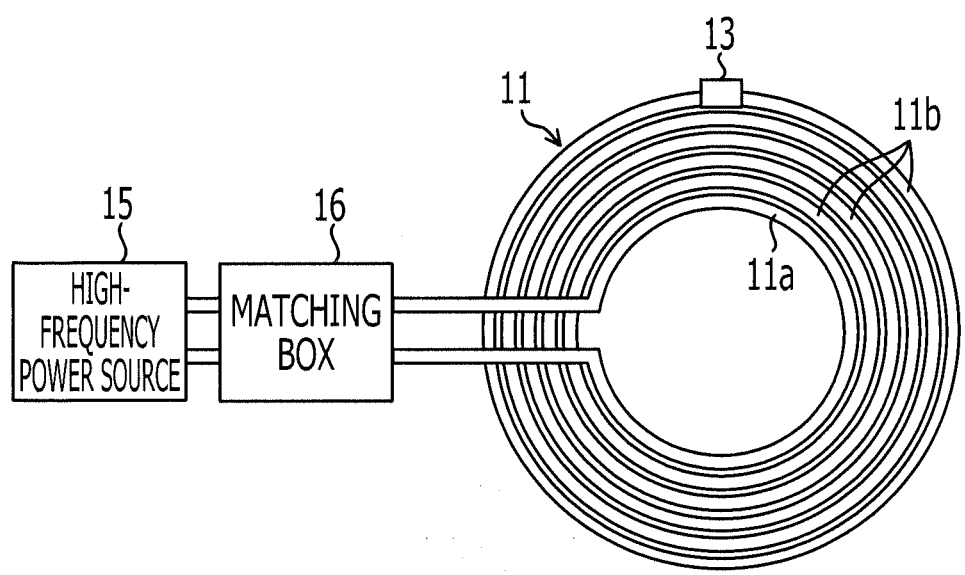
FIG. 2 illustrates an overview of a power transmitting device illustrated in FIG. 1.
Figure 3:
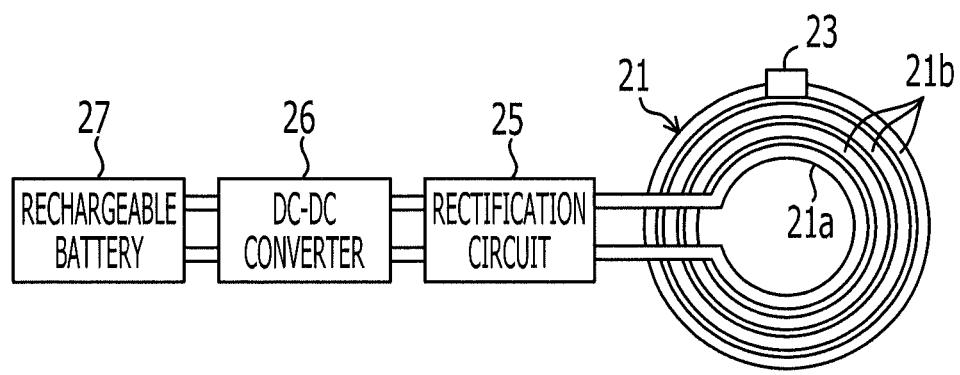
FIG. 3 illustrates an overview of a power receiving device illustrated in FIG. 1.

FIG. 1 schematically illustrates a wireless power transmission system of magnetic field resonance type. FIG. 2 illustrates an overview of a power transmitting device illustrated in FIG. 1. FIG. 3 illustrates an overview of a power receiving device illustrated in FIG. 1.

As illustrated in FIG. 1, a wireless power transmitting device (power transmitting device) 10 includes a power transmitting coil 11 which includes a primary coil 11a and a secondary coil 11b. A power receiving device 20 includes a power receiving coil 21 which includes a third coil 21b and a fourth coil 21a. The coils 11a, 11b, 21a, and 21b are planar spiral coils, each wound in two layers. The planar spiral coils are air-core coils. In the power transmitting device 10, a box having a feeding surface and internally provided with the power transmitting coil 11 is a housing.

As illustrated in FIG. 2, the primary coil 11a of the power transmitting device 10 is connected through a matching box 16 to a high-frequency power source 15, from which a high-frequency current is supplied to the primary coil 11a. The secondary coil 11b of the power transmitting device 10 is concentrically wound around the primary coil 11a.

A capacitor 13 is connected to the secondary coil 11b, which forms a resonant circuit with the capacitor 13. The resonance frequency of the resonant circuit is determined by the inductance of the secondary coil 11b and the capacitance of the capacitor 13.

As illustrated in FIG. 3, the fourth coil 21a of the power receiving device 20 is connected through a rectification circuit 25 and a direct current to direct current (DC-DC) converter 26 to a rechargeable battery 27. The third coil 21b of the power receiving device 20 is concentrically wound around the fourth coil 21a.

A capacitor 23 is connected to the third coil 21b, which forms a resonant circuit with the capacitor 23. The resonance frequency of the resonant circuit is determined by the inductance of the third coil 21b and the capacitance of the capacitor 23. The inductance of the secondary coil 11b, the inductance of the third coil 21b, and the capacitances of the capacitors 13 and 23 are determined such that the resonance frequency of the resonant circuit in the power receiving device 20 is the same as that of the resonant circuit in the power transmitting device 10.

In the wireless power transmission system described above, supplying a high-frequency current from the high-frequency power source 15 through the matching box 16 to the primary coil 11a of the power transmitting device 10 produces magnetic flux lines around the primary coil 11a. The resulting electromagnetic induction causes a high-frequency current to flow through the secondary coil 11b. The high-frequency current produces an alternating-current magnetic field with the resonance frequency around the secondary coil 11b.

The resonant circuit in the power receiving device 20 resonates with the alternating-current magnetic field produced around the secondary coil 11b of the power transmitting device 10. This causes a high-frequency current to flow in the third coil 21b. The flow of the high-frequency current in the third coil 21b produces magnetic flux dines around the third coil 21b. Then, the resulting electromagnetic induction transmits power to the fourth coil 21a. The power is rectified by the rectification circuit 25, adjusted to a certain voltage by the DC-DC converter 26, and supplied to the rechargeable battery 27. Thus, the rechargeable battery 27 is charged.

If the high-frequency power source 15 and the matching box 16 are directly connected to the secondary coil 11b, a change in the resistance, capacitance, or inductance of the high-frequency power source 15 and the matching box 16 may cause a change in the resonance frequency of the resonant circuit or may reduce the Q value, which is an index indicating the quality of resonance. Therefore, as illustrated in FIG. 2, the primary coil 11a is provided to allow connection of the high-frequency power source 15 and the matching box 16 to the primary coil 11a, so that the secondary coil 11b is electrically separated from the high-frequency power source 15 and the matching box 16. The primary coil 11a is positioned near the secondary coil 11b so that power is transmitted from the primary coil 11a to the secondary coil 11b by electromagnetic induction.

Similarly, if the rectification circuit 25 and others are directly connected to the third coil 21b of the power receiving device 20, the resonance frequency of the resonant circuit may be changed or the Q value may be reduced. Therefore, the fourth coil 21a is provided in the power receiving device 20 to electrically separate the third coil 21b from the rectification circuit 25 and others.

In a region where the distance from the secondary coil 11b is sufficiently shorter than the wavelength of an electromagnetic wave emitted from the secondary coil 11b, the electromagnetic wave loses its nature as a wave. Examples of such a region include a region where the distance from the secondary coil 11b is less than or equal to one-quarter of the wavelength of an electromagnetic wave emitted from the secondary coil 11b. A region where such a distance is sufficiently shorter than the wavelength of an electromagnetic wave is referred to as a near field. In the near field, power may be transmitted using magnetic field resonance.

As compared to wireless power transmission using electromagnetic induction, wireless power transmission using magnetic field resonance has a larger margin of positional displacement between the power transmitting coil 11 and the power receiving coil 21. In other words, even if the power receiving coil 21 is vertically and horizontally displaced from the power transmitting coil 11, a decrease in the efficiency of wireless power transmission using magnetic field resonance is small. Note that the vertical direction is a direction parallel to the central axes of coils, and the horizontal direction is a direction orthogonal to the central axes of coils.

Additionally, even if the power transmitting coil 11 and the power receiving coil 21 are different in size, the wireless power transmission system using magnetic field resonance may transmit power with high efficiency.

By taking advantages of these features, the research and development of wireless power transmission systems of magnetic field resonance type has been carried out in which small mobile devices such as mobile phones, medium-sized mobile devices such as notebook personal computers, or large devices such as electric vehicles or robots serve as power receiving devices.

For example, when a rechargeable battery of a mobile phone is to be wirelessly charged using electromagnetic induction, the power transmission efficiency may be significantly reduced if the positional relationship between a coil of a power transmitting device and a coil of a power receiving device deviates by several millimeters from a designed value. As a solution to this, a special cradle for the mobile phone may be used as a power transmitting device to maintain the same positional relationship between the coils of the power transmitting device and the power receiving device. In this case, however, the cradle has to be replaced for each new mobile phone.

In contrast, in a wireless power transmission system of magnetic field resonance type, power may be transmitted with high efficiency even if a coil of a power receiving device is vertically and horizontally displaced by about 10 mm to 20 mm from a coil of a power transmitting device. This means that one power transmitting device may accommodate many types of mobile phones. Therefore, the cradle does not have to be replaced for each new mobile phone.

Moreover, since the wireless power transmission system of magnetic field resonance type allows a size difference between a power transmitting coil and a power receiving coil, a plurality of mobile phones may be charged simultaneously by one power transmitting device having a large power transmitting coil. Additionally, since the form of the power transmitting device does not have to be changed for each model of mobile phone, it is easy to realize services which allow users to charge mobile phones in outside locations.

Figure 4A:
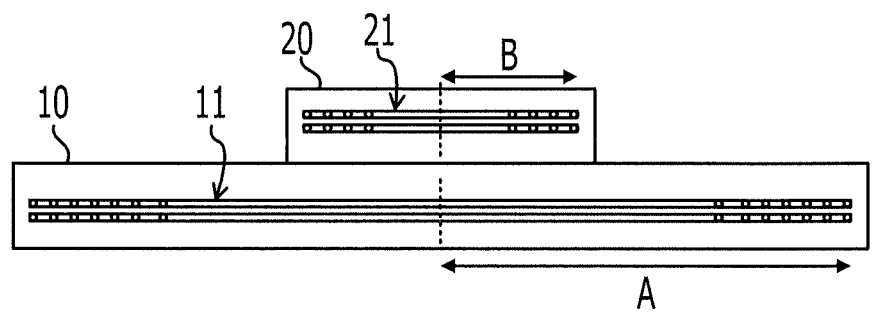
FIG. 4A and FIG. 4B illustrate the wireless power transmission system of magnetic field resonance type illustrated in FIG. 1.

However, the wireless power transmission system of magnetic field resonance type has some problems. For example, as illustrated in FIG. 4A, assume that there is a wireless power transmission system in which an outer radius A of the power transmitting coil 11 of the power transmitting device 10 is larger than an outer radius B of the power receiving coil 21 of the power receiving device 20. Also, assume that the matching condition of the matching box 16 connected to the primary coil 11a is the same regardless of the position of the power receiving device 20.

Figure 4B:
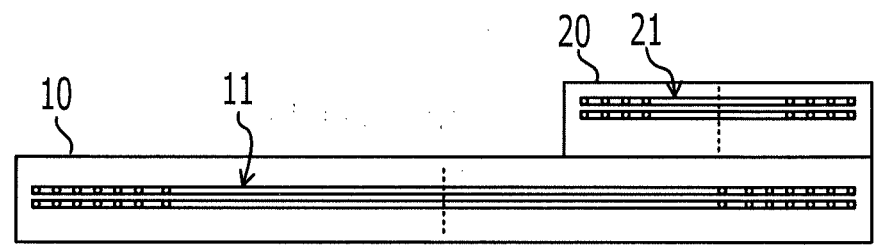

In this wireless power transmission system, if the power receiving device 20 is horizontally moved as illustrated in FIG. 4B, the received power of the power receiving device 20 is changed.

Figure 5:
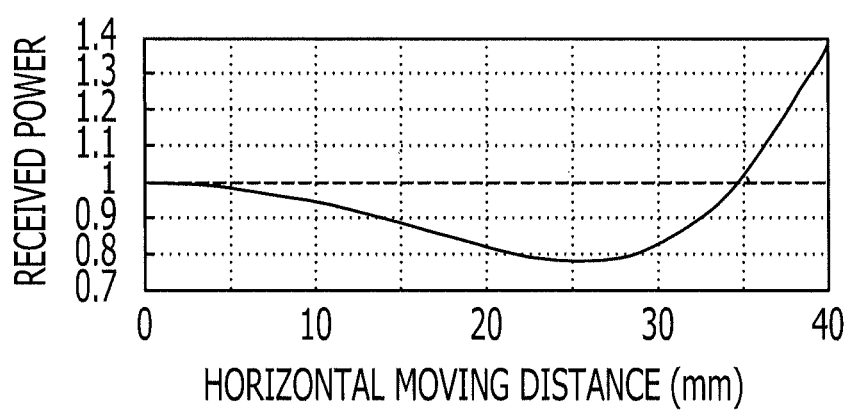
FIG. 5 illustrates a relationship between horizontal moving distance and received power of the power receiving device in the wireless power transmission system illustrated in FIG. 4A and FIG. 4B.

FIG. 5 illustrates a relationship between horizontal moving distance and received power of the power receiving device 20. The horizontal axis in FIG. 5 represents a horizontal moving distance of the power receiving device 20 from a reference point (0) at which the central axis of the power transmitting coil 11 coincides with the central axis of the power receiving coil 21. The vertical axis in FIG. 5 represents received power of the power receiving device 20 normalized with respect to power received when the power receiving coil 21 is located at the reference point. The power received when the power receiving coil 21 is located at the reference point is set to 1 for normalization.

The relationship between horizontal moving distance and received power of the power receiving device 20 is determined by using an electromagnetic analysis simulator and an electric circuit analysis simulator, in which such values as circuit constants and frequencies are entered. Here, the outer radius A of the power transmitting coil 11 is 60 mm, the outer radius B of the power receiving coil 21 is 20 mm, and a vertical distance between the power transmitting coil 11 and the power receiving coil 21 is 10 mm.

As may be seen from FIG. 5, when the horizontal moving distance of the power receiving device 20 is as small as 0 mm to about 35 mm, the received power is less than 1. The charging time may be slightly long, but no serious problem may occur in this case.

However, the received power increases significantly as the power receiving coil 21 approaches the power transmitting coil 11. In the example of FIG. 5, the received power increases significantly when the moving distance is about 35 mm to 40 mm. This may cause heat generation in the rechargeable battery 27, shorten the life of the rechargeable battery 27, or damage the rectification circuit 25 or the DC-DC converter 26 in the power receiving device 20.

First Embodiment

Figure 6:
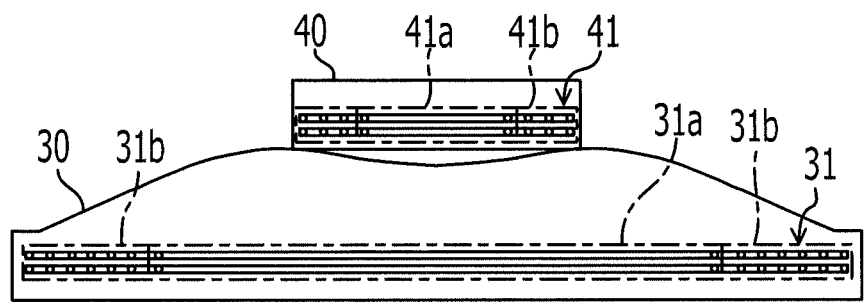
FIG. 6 illustrates a configuration of a wireless power transmitting device and a wireless power transmission system according to a first embodiment.
Figure 7:
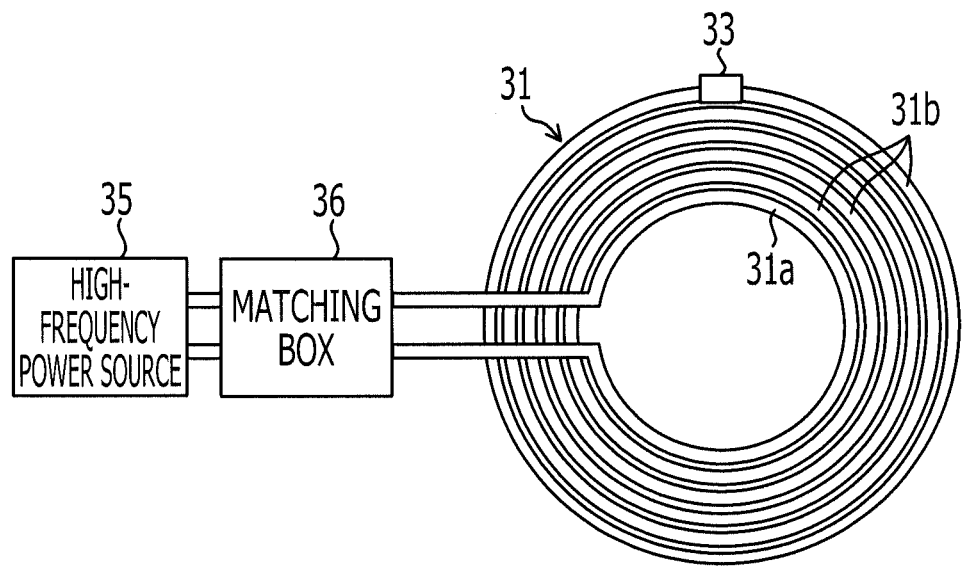
FIG. 7 illustrates an overview of the power transmitting device illustrated in FIG. 6.
Figure 8:
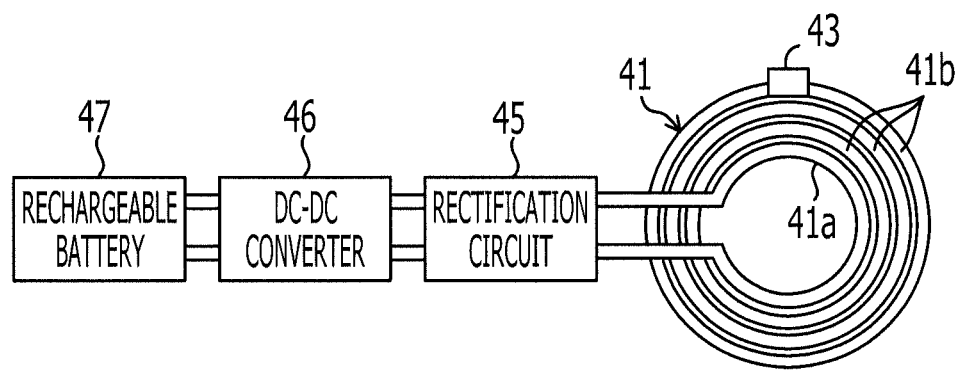
FIG. 8 illustrates an overview of a power receiving device illustrated in FIG. 6.

FIG. 6 illustrates a configuration of a wireless power transmitting device and a wireless power transmission system according to a first embodiment. FIG. 7 illustrates an overall configuration of the power transmitting device illustrated in FIG. 6. FIG. 8 illustrates an overall configuration of a power receiving device illustrated in FIG. 6.

As illustrated in FIG. 6, a wireless power transmitting device (power transmitting device) 30 includes a power transmitting coil 31 which includes a primary coil 31a and a secondary coil 31b. In the power transmitting device 30 illustrated in FIG. 6, a box internally provided with the power transmitting coil 31 is a housing. A power receiving device 40 includes a power receiving coil 41 which includes a third coil 41b and a fourth coil 41a. The coils 31a, 31b, 41a, and 41b are planar spiral coils, each wound in two layers.

As illustrated in FIG. 7, the primary coil 31a of the power transmitting device 30 is connected through a matching box 36 to a high-frequency power source 35, from which a high-frequency current is supplied to the primary coil 31a. The secondary coil 31b of the power transmitting device 30 is concentrically wound around the primary coil 31a.

A capacitor 33 is connected to the secondary coil 31b, which forms a resonant circuit with the capacitor 33. The resonance frequency of the resonant circuit is determined by the inductance of the secondary coil 31b and the capacitance of the capacitor 33.

In the first embodiment, the primary coil 31a is 21 mm in outer radius and is made from a single turn of wire wound in two layers. A pitch between the two layers is 2 mm. The secondary coil 31b is 40 mm in outer radius and is made from ten turns of wire wound with a pitch of 1.9 mm in two layers. A pitch between the two layers is 2 mm. The primary coil 31a and the secondary coil 31b are made of copper wires with a diameter of 1 mm.

Also in the first embodiment, the capacitance of the capacitor 33 is set to 15 pF, and the resonance frequency of the resonant circuit is set to 5 MHz.

As illustrated in FIG. 8, the fourth coil 41a of the power receiving device 40 is connected through a rectification circuit 45 and a DC-DC converter 46 to a rechargeable battery 47. The third coil 41b of the power receiving device 40 is concentrically wound around the fourth coil 41a.

A capacitor 43 is connected to the third coil 41b, which forms a resonant circuit with the capacitor 43. The resonance frequency of the resonant circuit is determined by the inductance of the third coil 41b and the capacitances of the capacitor 43. The inductance of the secondary coil 31b, the inductance of the third coil 41b, and the capacitances of the capacitors 33 and 43 are determined such that the resonance frequency of the resonant circuit in the power receiving device 40 is the same as that of the resonant circuit in the power transmitting device 30.

In the first embodiment, the third coil 41b is 20 mm in outer radius and is made from five turns of wire wound with a pitch of 1.9 mm in two layers. For example, a pitch between the two layers is 2 mm. The fourth coil 41a is 11 mm in outer radius and is made from a single turn of wire wound in two layers. For example, a pitch between the two layers is 0.6 mm. The third coil 41b and the fourth coil 41a are made of copper wires with a diameter of 0.6 mm.

The capacitance of the capacitor 43 is set to 430 pF, and the resonance frequency of the resonant circuit is set to 5 MHz.

In the first embodiment, the power receiving device 40 is placed on an upper surface of the power transmitting device 30 for wireless power feeding from the power transmitting device 30 to the power receiving device 40 using magnetic field resonance. Hereinafter, the upper surface of the power transmitting device 30 will be referred to as a feeding surface. As may be seen from FIG. 6, the power transmitting coil 31 is positioned such that the central axis thereof is vertical. The central axis of the power transmitting coil 31 intersects with the feeding surface of the power transmitting device 30.

In the first embodiment, as illustrated in FIG. 6, the feeding surface of the power transmitting device 30 has raised and recessed portions which are formed in accordance with power received at each position.

Figure 9:
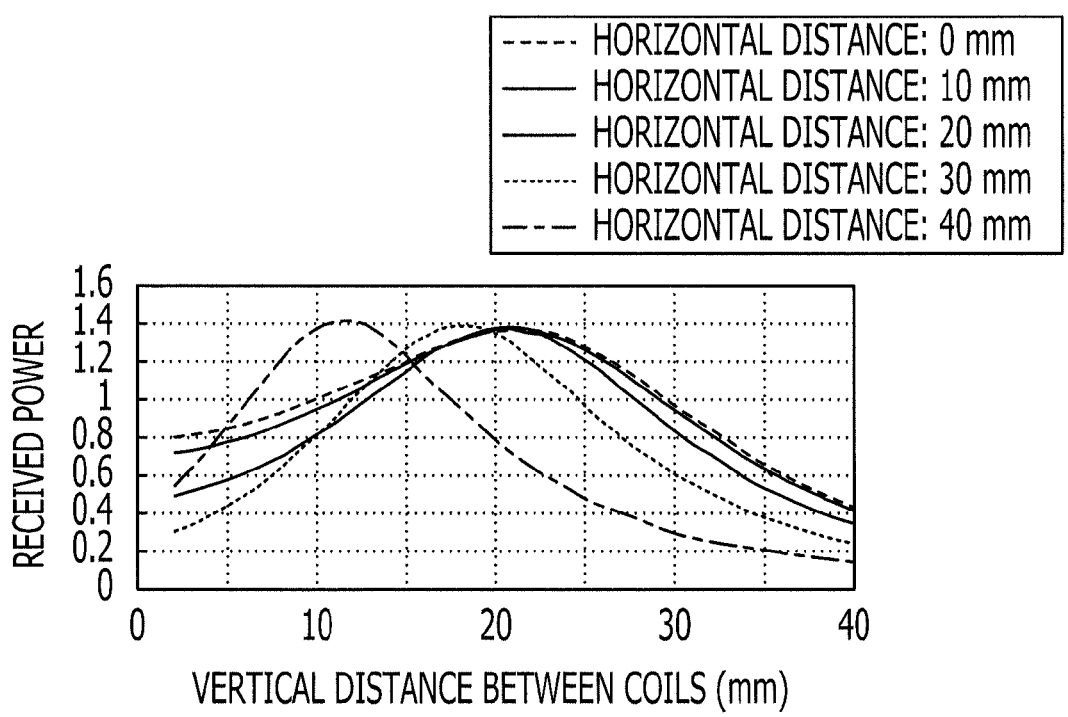
FIG. 9 illustrates a result of analysis which analyzed, for each horizontal distance, a relationship, between received power and vertical distance between coils.

FIG. 9 illustrates a result of analysis which analyzed, for each horizontal distance, a relationship between received power and vertical distance between the power transmitting coil 31 and the power receiving coil 41. In FIG. 9, the horizontal axis represents a vertical distance between the power transmitting coil 31 and the power receiving coil 41 and the vertical axis represents received power. An electromagnetic analysis simulator and an electric circuit analysis simulator were used in this analysis. Here, a point at which the central axis of the power transmitting coil 31 coincides with the central axis of the power receiving coil 41 is regarded as a point at which the horizontal distance is 0 mm. In FIG. 9, the received power is indicated with respect to power (=1) received when the horizontal distance is 0 mm and the distance between the power transmitting coil 31 and the power receiving coil 41 is 10 mm.

Figure 10:
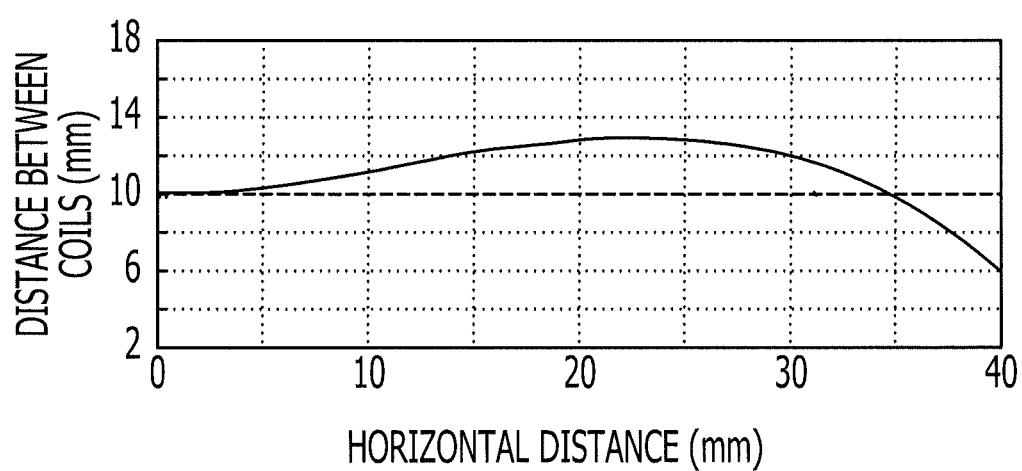
FIG. 10 illustrates a curve that connects points at which received power is 1 in FIG. 9.

FIG. 10 illustrates a curve that connects points at which received power is 1 in FIG. 9. For each horizontal distance in FIG. 9, there are two points at which received power is 1. Of the two points, a point at which the vertical distance between the power transmitting coil 31 and the power receiving coil 41 is closer to 10 mm, which serves as a reference value, is used in FIG. 10.

The same received power may be maintained by moving the power receiving device 40 and the power receiving coil 41 along the curve illustrated in FIG. 10. Hereinafter, a plane defined by this curve, for example, a plane formed by allowing the curve to run around the central axis of the power transmitting coil 31 will be referred to as an equal power plane. Note that the central axis is a line at which the horizontal distance is 0 in FIG. 10.

In the wireless power transmission system of the first embodiment illustrated in FIG. 6, the raised and recessed portions of the feeding surface of the power transmitting device 30 are formed to follow the equal power plane. Therefore, the received power may be maintained at substantially the same level regardless of where the power receiving device 40 is positioned on the feeding surface. This makes it possible to suppress heat generation in the rechargeable battery 47 and damage to the rectification circuit 25 and the DC-DC converter 26 caused by excessive supply of power.

(First Modification)

Figure 11A:
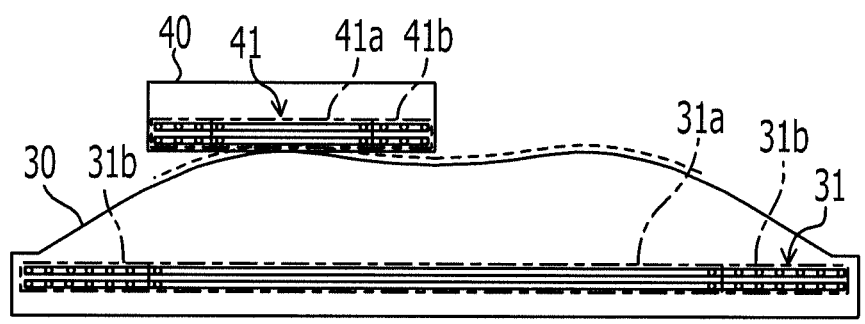
FIG. 11A illustrates an example where a power receiving coil according to the first embodiment is placed in an equal power plane.
Figure 11B:
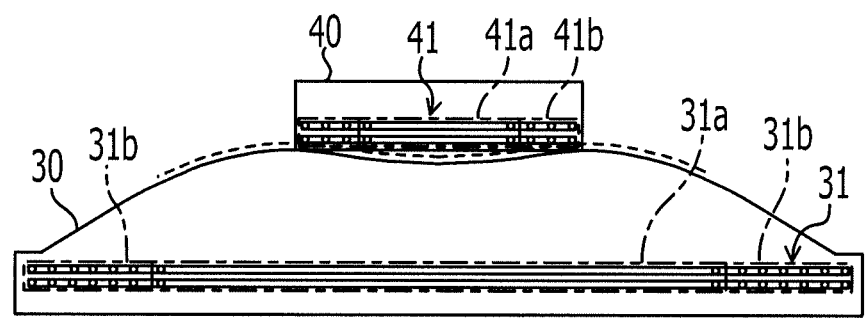
FIG. 11B illustrates an example where the power receiving coil according to the first embodiment fails to be placed in the equal power plane.

In the wireless power transmission system illustrated in FIG. 6 where the feeding surface of the power transmitting device 30 has raised and recessed portions, a lower surface of the power receiving device 40 is flat. For example, as illustrated in FIG. 11A, at a raised portion of the feeding surface, the power receiving coil 41 (i.e., the center of the power receiving coil 41) may be placed in the equal power plane indicated by a broken line. However, as illustrated in FIG. 11B, the power receiving coil 41 may fail to be placed in the equal power plane at a recessed portion of the feeding surface.

Figure 12:
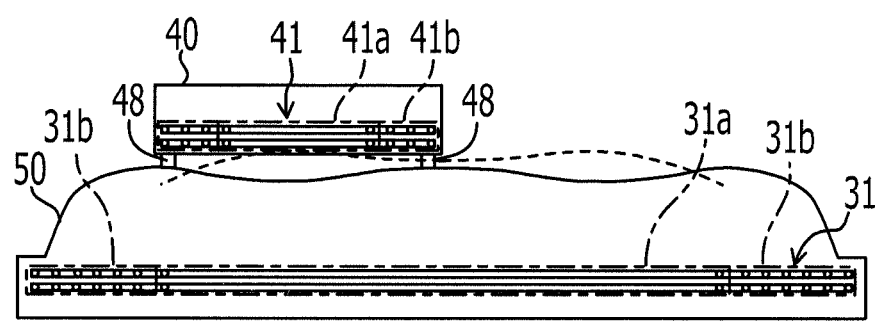
FIG. 12 illustrates a wireless power transmission system according to a first modification of the first embodiment.

Thus, in a first modification of the first embodiment, as illustrated in FIG. 12, pads 48 are provided at the edge of the bottom surface of the power receiving device 40. The pads 48 are, for example, 2.5 mm in height. A feeding surface of a wireless power transmitting device (power transmitting device) 50 has raised and recessed portions which allow the center of the power receiving coil 41 of the power receiving device 40 to move along an equal power plane indicated by a broken line in FIG. 12. It is thus possible to achieve more uniformity in power transmission efficiency in the horizontal direction of the feeding surface.

In FIG. 12, the same components as those illustrated in FIG. 6 are assigned the same reference numerals and their detailed description will be omitted.

(Second Modification)

Figure 13:
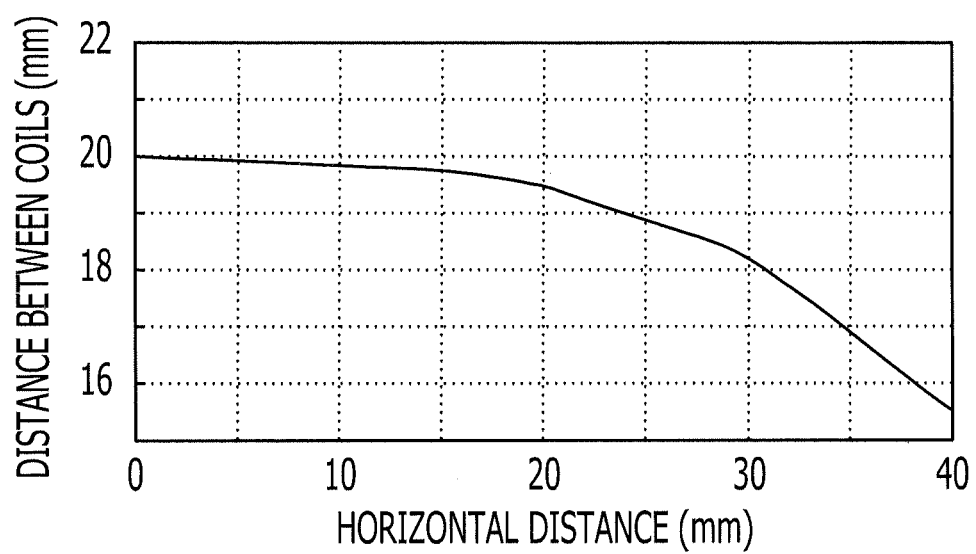
FIG. 13 illustrates a curve that connects points at which received power is the same.

FIG. 13 illustrates a curve that connects points at which received power is the same. As in FIG. 10, the horizontal axis represents a horizontal distance and the vertical axis represents a distance between the power transmitting coil 31 and the power receiving coil 41. Here, the power received when the central axis of the power transmitting coil 31 coincides with the central axis of the power receiving coil 41 and the distance between the power transmitting coil 31 and the power receiving coil 41 is 20 mm is regarded as 1, and a point at which received power is 1 is determined for each position in the horizontal direction.

Figure 14:
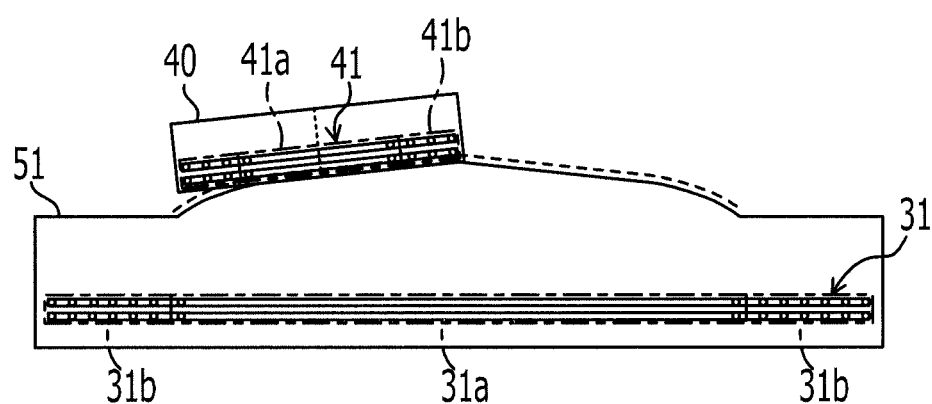
FIG. 14 illustrates a power transmitting device having a feeding surface formed to follow the curve illustrated in FIG. 13.

FIG. 14 illustrates a wireless power transmitting device (power transmitting device) 51 having a feeding surface formed to follow the curve illustrated in FIG. 13. The feeding surface, which is an upper surface of the power transmitting device 51, has a curved portion corresponding to an inner region of the power transmitting coil 31 and a flat portion outside the curved portion. The curved portion of the feeding surface of the power transmitting device 51 is formed along an equal power plane, whereas the flat portion of the feeding surface of the power transmitting device 51 is parallel to the power transmitting coil 31. The equal power plane is indicated by a broken line in FIG. 14.

Figure 15:
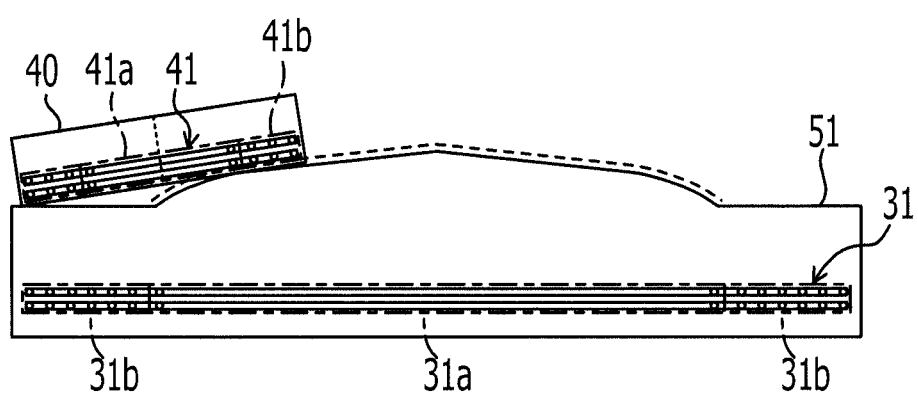
FIG. 15 illustrates a problem with the power transmitting device illustrated in FIG. 14.

As illustrated in FIG. 15, when the power receiving device 40 is placed at an edge of the feeding surface of the power transmitting device 51, a distance between coil wires of the power receiving coil 41 and coil wires of the power transmitting coil 31 is large. As a result, the power receiving coil 41 of the power receiving device 40 may receive power larger than a designed value. This may cause heat generation in the rechargeable battery 47 and damage the rectification circuit 45 and the DC-DC converter 46 (see FIG. 8).

Figure 16:
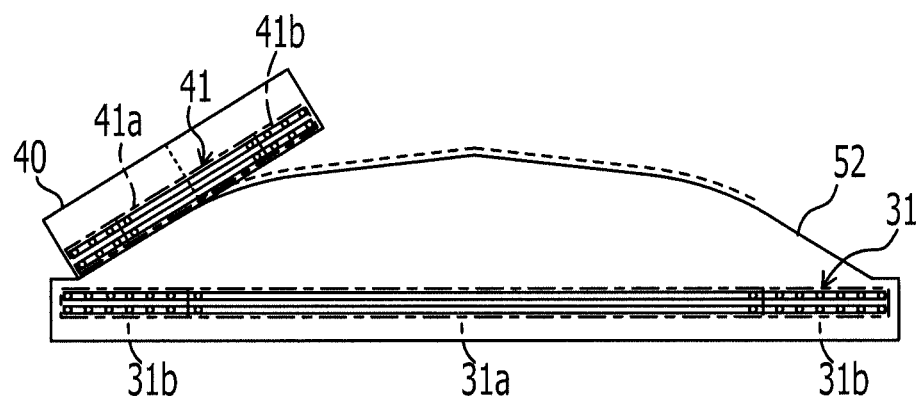
FIG. 16 illustrates a wireless power transmission system according to a second modification of the first embodiment.

Therefore, in a second modification of the first embodiment, as illustrated in FIG. 16, a feeding surface of a wireless power transmitting device (power transmitting device) 52 has an inclined portion at an edge thereof. The inclined portion is formed such that the distance between coil wires of the power receiving coil 41 and coil wires of the power transmitting coil 31 decreases toward the outside of the power transmitting device 52. Thus, even if the power receiving device 40 is placed at the edge of the feeding surface of the power transmitting device 52, it is possible to suppress excessive supply of power, heat generation in the rechargeable, battery 47, and damage to the rectification circuit 45 and the DC-DC converter 46.

(Other Modifications)

Figure 17:
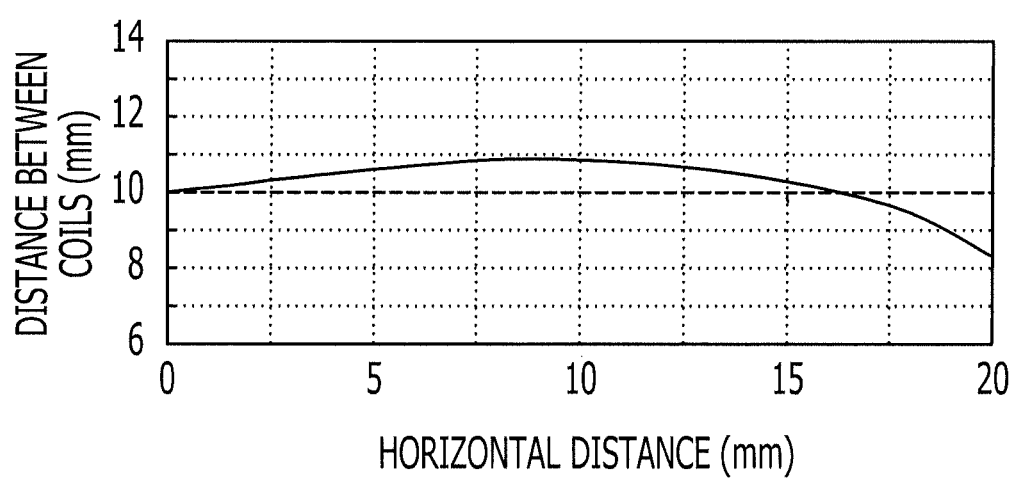
FIG. 17 illustrates a curve that connects points at which received power is the same.

FIG. 17 illustrates a curve that connects points at which received power is the same. As in FIG. 10, the horizontal axis represents a horizontal distance and the vertical axis represents a distance between a power transmitting coil and a power receiving coil. Here, a primary coil is 21 mm in outer radius and is made from a single turn of wire wound in two layers. A pitch between the two layers is, for example, 2 mm. A secondary coil is 40 mm in outer radius and is made from ten turns of wire wound with a pitch of 1.9 mm in two layers. A pitch between the two layers is, for example, 2 mm.

A third coil is 10 mm in outer radius and is made from five turns of wire wound in two layers. A pitch between the two layers is, for example, 1.9 mm. A fourth coil is 11 mm in outer radius and is made from a single turn of wire wound in two layers.

A reference distance between the power transmitting coil and the power receiving coil is 10 mm, and a resonance frequency is 5 MHz. The capacitance of a capacitor in the power transmitting coil is 30 pF, and the capacitance of a capacitor in the power receiving coil is 430 pF.

Figure 18:
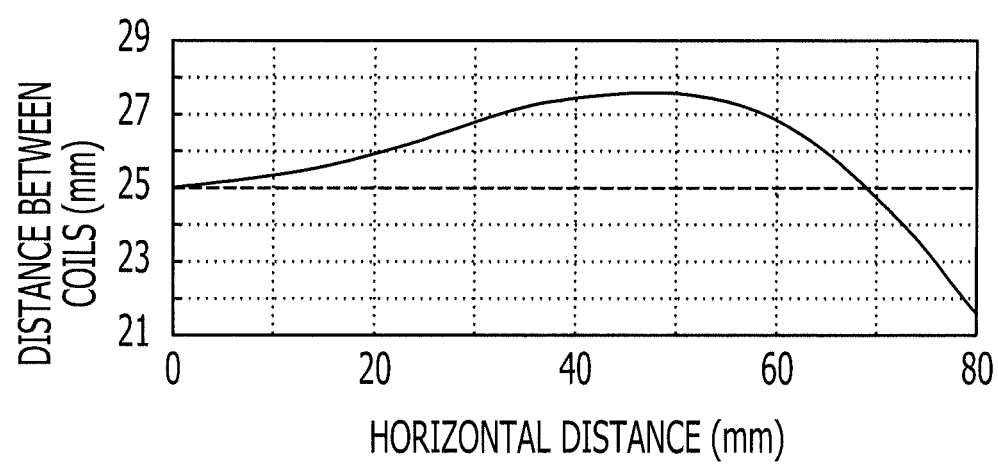
FIG. 18 also illustrates a curve that connects points at which received power is the same.

FIG. 18 also illustrates a curve that connects points at which received power is the same. As in FIG. 10, the horizontal axis represents a horizontal distance and the vertical axis represents a distance between a power transmitting coil and a power receiving coil. Here, a primary coil is 81 mm in outer radius and is made from a single turn of wire wound in two layers. A pitch between the two layers is, for example, 2 mm. A secondary coil is 100 mm in outer radius and is made from ten turns of wire wound in two layers. A pitch between the two layers is, for example, 2 mm.

A third coil is 20 mm in outer radius and is made from five turns of wire wound in two layers. A pitch between the two layers is, for example, 1.9 mm. A fourth coil is 11 mm in outer radius and is made from a single turn of wire wound in two layers. A pitch between the two layers is, for example, 1.9 mm.

A reference distance between the power transmitting coil and the power receiving coil is 25 mm, and a resonance frequency is 5 MHz. The capacitance of a capacitor in the power transmitting coil is 7 pF, and the capacitance of a capacitor in the power receiving coil is 430 pF.

As illustrated in FIG. 17 and FIG. 18, the shape of the equal power plane varies depending on, for example, the configurations of the power transmitting coil and the power receiving coil, the resonance frequency, and the distance between the power transmitting coil and the power receiving coil. The shape of the feeding surface of the power transmitting device may be determined, as in the embodiment described above, by defining the equal power plane on the basis of the curve illustrated in FIG. 17 or FIG. 18.

Second Embodiment

Figure 19:
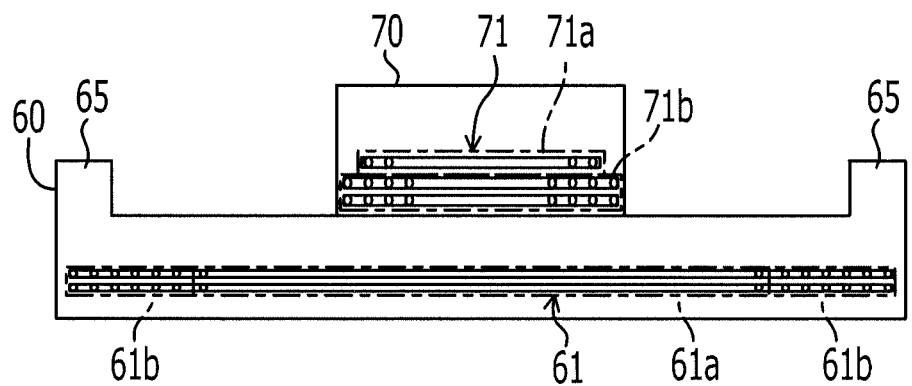
FIG. 19 illustrates a configuration of a wireless power transmitting device and a wireless power transmission system according to a second embodiment.

FIG. 19 illustrates a configuration of a wireless power transmitting device and a wireless power transmission system according to a second embodiment.

As illustrated in FIG. 19, a wireless power transmitting device (power transmitting device) 60 includes a power transmitting coil 61 which includes a primary coil 61a and a secondary coil 61b. A power receiving device 70 includes a power receiving coil 71 which includes a third coil 71b and a fourth coil 71a. The coils 61a, 61b, 71a, and 71b are planar spiral coils.

As in the first embodiment, the primary coil 61a is connected through a matching box (not illustrated) to a high-frequency power source (not illustrated). The secondary coil 61b is concentrically wound around the primary coil 61a. A capacitor (not illustrated) is connected to the secondary coil 61b, which forms a resonant circuit with the capacitor.

In the second embodiment, the primary coil 61a is 41 mm in outer radius and is made from a single turn of wire wound in two layers. The secondary coil 61b is 60 mm in outer radius and is made from ten turns of wire wound in two layers.

As in the first embodiment, the third coil 71b of the power receiving device 70 is connected to a capacitor (not illustrated), which forms a resonant circuit with the third coil 71b. The inductance of the secondary coil 61b, the inductance of the third coil 71b, and the capacitances of the capacitors are determined such that the resonance frequency of the resonant circuit in the power receiving device 70 is the same as that of the resonant circuit in the power transmitting device 60.

The fourth coil 71a is connected through a rectification circuit (not illustrated) and a DC-DC converter (not illustrated) to a rechargeable battery (not illustrated).

In the second embodiment, the third coil 71b is 20 mm in outer radius and is made from five turns of wire wound in two layers. The fourth coil 71a is disposed above the third coil 71b. The fourth coil 71a is 17 mm in outer radius and is made from a single turn of wire wound in two layers. Alternatively, as in the first embodiment, the fourth coil 71a may be concentrically disposed inside the third coil 71b.

The coils 61a, 61b, 71a, and 71b are made of, for example, copper wires with a diameter of 1 mm or 0.6 mm.

In the second embodiment, as illustrated in FIG. 19, the power transmitting device 60 has a raised portion 65 above an outer region of the power transmitting coil 61. This means that an upper surface of the power transmitting device 60 has a step. The outer region of the power transmitting coil 61 is an area where there are coil wires. The upper surface of the power transmitting device 60 serves as a feeding surface. Assume that when the power receiving device 70 is placed at the bottom of a recessed portion of the feeding surface of the power transmitting device 60, the distance between the power transmitting coil 61 and the power receiving coil 71 is 10 mm. The recessed portion of the feeding surface is 112 mm in diameter, and the raised portion 65 is 10 mm in height. The height of the raised portion 65 is a height above the bottom of the recessed portion.

Figure 20:
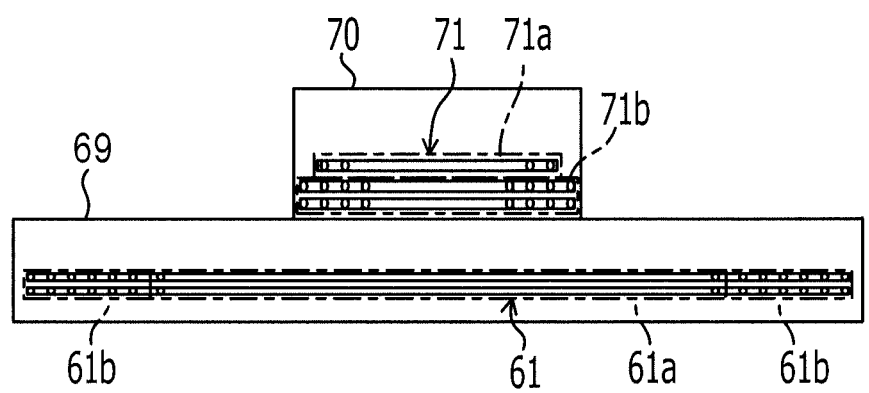
FIG. 20 illustrates a wireless power transmission system according to a comparative example.

FIG. 20 is an explanatory drawing for ease of understanding the second embodiment. FIG. 20 illustrates a wireless power transmission system according to a comparative example. In FIG. 20, the same components as those illustrated in FIG. 19 are assigned the same reference numerals.

The wireless power transmission system of this comparative example has the same structure as that of the wireless power transmission system illustrated in FIG. 19, except that a wireless power transmitting device (power transmitting device) 69 has a flat feeding surface.

Figure 21A:
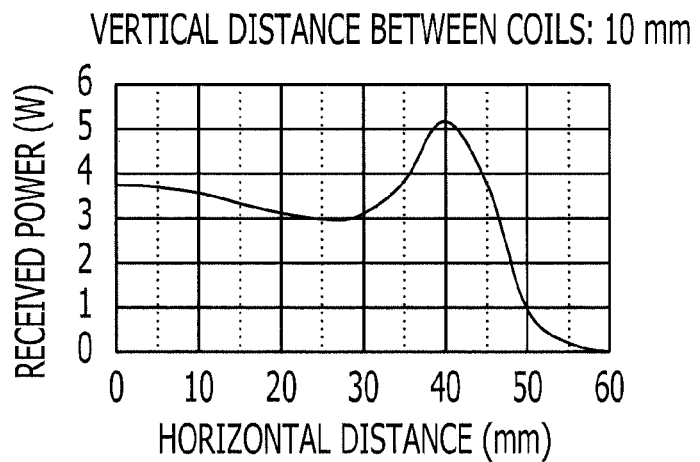
FIG. 21A to FIG. 21C each illustrate a result of examination which examined a relationship between horizontal distance and received power in the wireless power transmission system illustrated in FIG. 20.
Figure 21B:
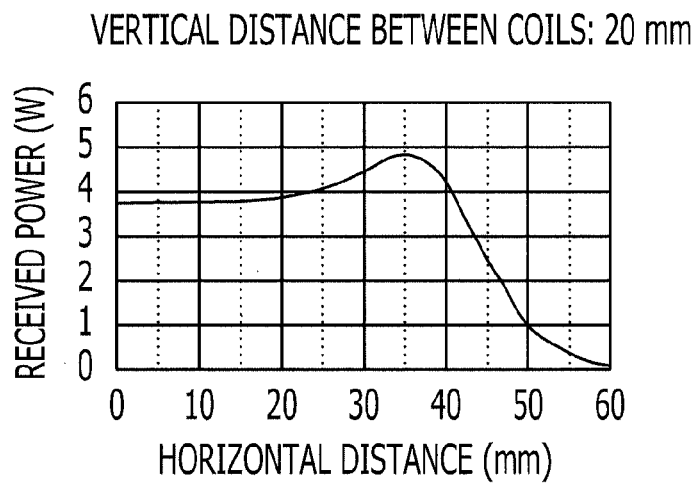
Figure 21C:
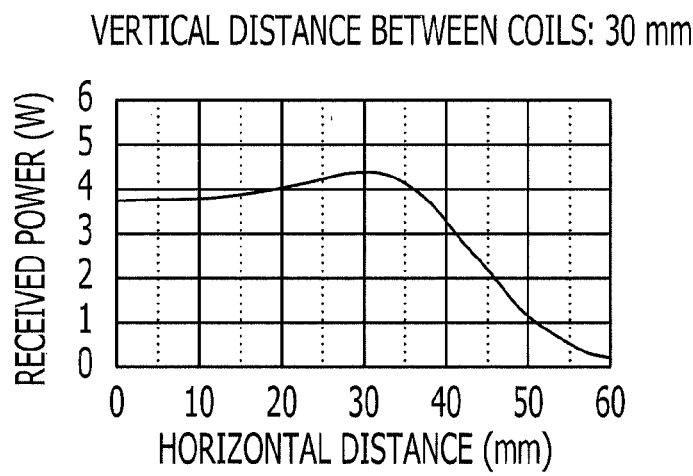

FIG. 21A to FIG. 21C each illustrate a result of examination which examined a relationship between horizontal distance and received power in the wireless power transmission system illustrated in FIG. 20. A vertical distance between the power transmitting coil 61 and the power receiving coil 71 is 10 mm in FIG. 21A, 20 mm in FIG. 21B, and 30 mm in FIG. 21C. In FIG. 21A to FIG. 21C, a point at which the central axis of the power transmitting coil 61 coincides with the central axis of the power receiving coil 71 is regarded as an origin in the horizontal direction.

Here, the appropriate received power and the maximum allowable received power of the power receiving device 70 are 3.75 W and 4.2 W, respectively. The appropriate received power is power received at a position where the central axis of the power transmitting coil 61 coincides with the central axis of the power receiving coil 71. Hereinafter, the appropriate received power will be referred to as designed received power. In FIG. 21A to FIG. 21C, the maximum allowable received power is exceeded when the power receiving device 70 is moved horizontally from the origin by about 25 mm to 35 mm.

Figure 22:
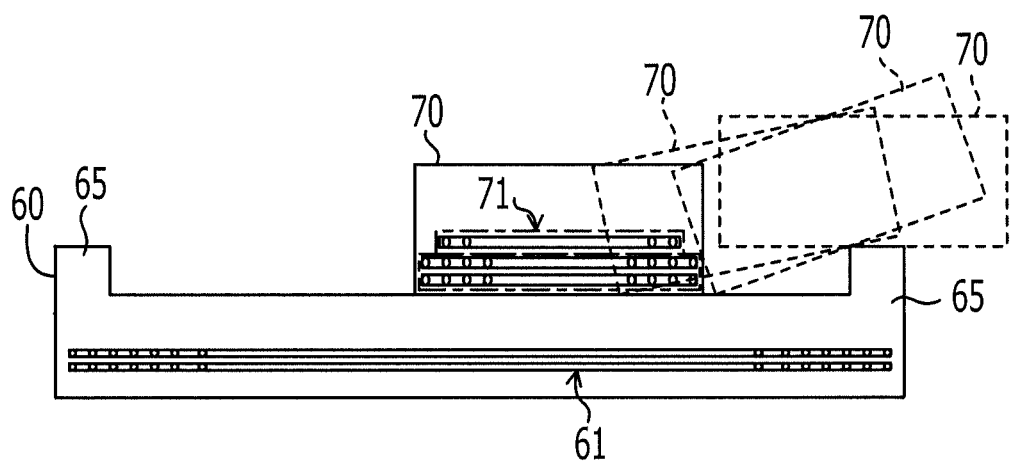
FIG. 22 illustrates a state in which a power receiving device is placed on a recessed portion, a raised portion, and a boundary between the recessed and raised portions of a feeding surface of the power transmitting device according to the second embodiment.

Therefore, in the second embodiment, as illustrated in FIG. 19, the raised portion 65 is provided above the outer region of the power transmitting coil 61. FIG. 22 illustrates a state in which the power receiving device 70 is placed on the recessed portion, the raised portion 65, and a boundary between the recessed portion and the raised portion 65 of the feeding surface of the power transmitting device 60.

Figure 23A:
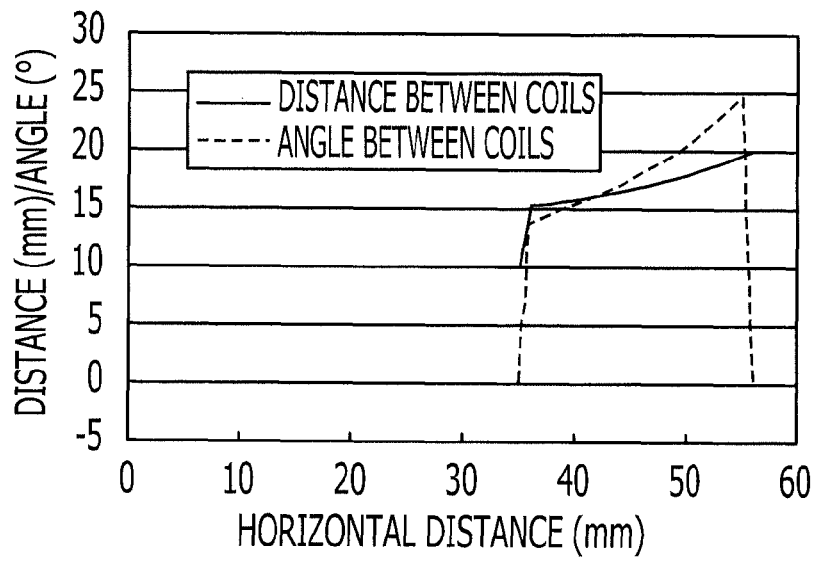
FIG. 23A illustrates a relationship between horizontal distance and distance between a power transmitting coil and a power receiving coil, and a relationship between horizontal distance and angle between the power transmitting coil and the power receiving coil.
Figure 23B:
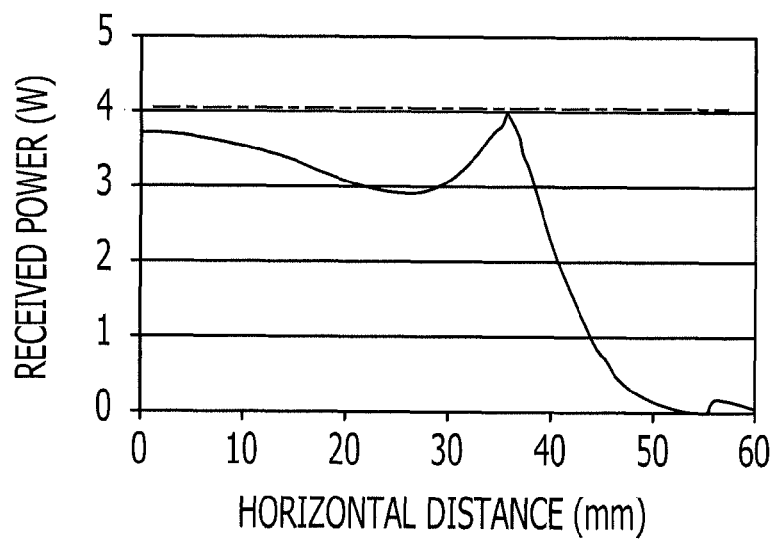
FIG. 23B illustrates a relationship between horizontal distance and received power, according to the second embodiment.

FIG. 23A illustrates a relationship between horizontal distance (represented by the horizontal axis) and distance between the power transmitting coil 61 and the power receiving coil 71 (represented by the vertical axis), and a relationship between horizontal distance (represented by the horizontal axis) and angle between the power transmitting coil 61 and the power receiving coil 71 (represented by the vertical axis). FIG. 23B illustrates a relationship between horizontal distance (represented by the horizontal axis) and received power (represented by the vertical axis).

As can be seen from FIG. 23A and FIG. 23B, in the second embodiment, the received power of the power receiving device 70 does not exceed the maximum allowable received power regardless of where the power receiving device 70 is placed on the feeding surface of the power transmitting device 60. For example, the maximum allowable received power is 4.2 W. Thus, since the power receiving device 70 does not receive excess power, it is possible to suppress heat generation in the rechargeable battery and damage to the rectification circuit and the DC-DC converter.

(First Modification)

Figure 24:
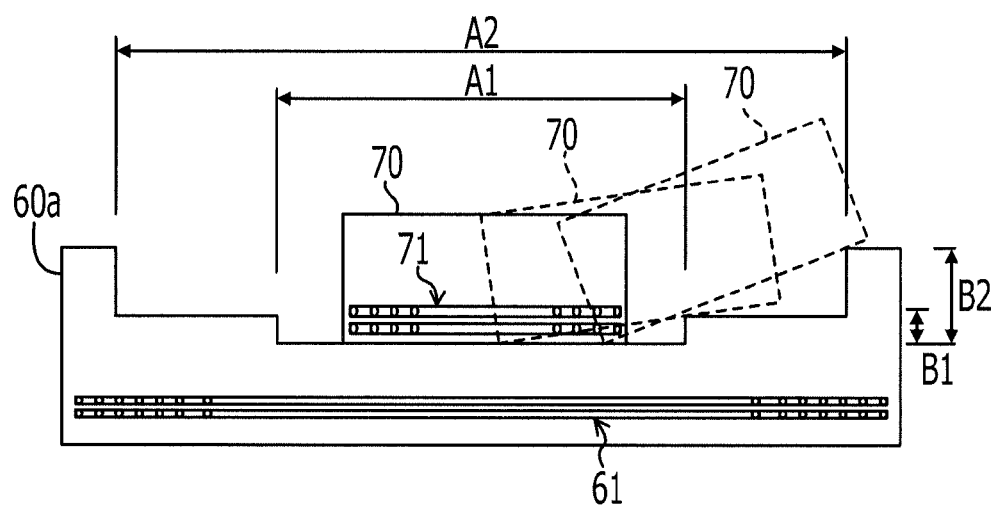
FIG. 24 illustrates a wireless power transmission system according to a first modification of the second embodiment.

FIG. 24 schematically illustrates a wireless power transmission system according to a first modification of the second embodiment. In FIG. 24, the same components as those illustrated in FIG. 19 are assigned the same reference numerals and their detailed description will be omitted.

In the first modification of the second embodiment, a feeding surface of a wireless power transmitting device (power transmitting device) 60a has two steps. A diameter A1 of a first step portion is 60 mm, and a diameter A2 of a second step portion is 112 mm. A height B1 of the first step portion is 2 mm, and a height B2 of the second step portion is 10 mm. Note that the height B1 of the first step portion is a height above the bottom of a recessed portion, and the height B2 of the second step portion is also a height above the bottom of the recessed portion.

In the power transmitting device 60 illustrated in FIG. 19, the received power is lowered when the horizontal distance of the power receiving device 70 is in the range of 20 mm to 30 mm. For example, when the horizontal distance is about 27 mm, the received power is 3 W or below (see FIG. 23B). In this example, the number of turns of each coil, the distance between coils, and the resonance frequencies are determined such that the designed received power at a position where the horizontal distance is 0 is 3.75 W. The position where the horizontal distance is 0 is a position where the central axis of the power transmitting coil 61 coincides with the central axis of the power receiving coil 71.

In the first modification of the second embodiment, in order for the received power not to fall below 3 W depending on where the power receiving device 70 is placed, the feeding surface of the power transmitting device 60a has two steps as illustrated in FIG. 24.

Figure 25A:
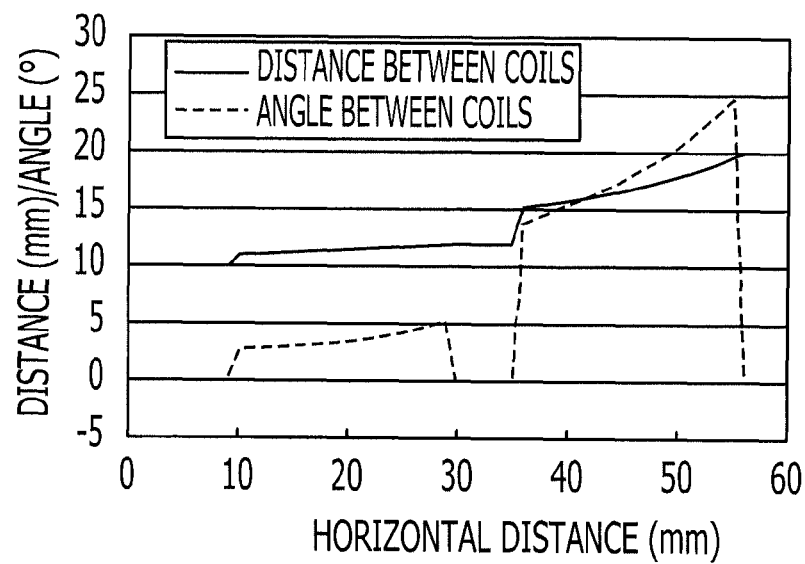
FIG. 25A illustrates a relationship between horizontal distance and distance between the power transmitting coil and the power receiving coil, and a relationship between horizontal distance and angle between the power transmitting coil and the power receiving coil.
Figure 25B:
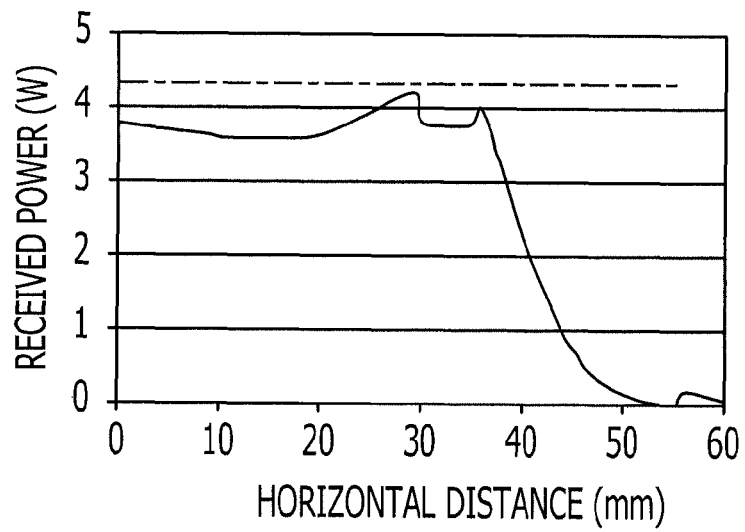
FIG. 25B illustrates a relationship between horizontal distance and received power, according to the first modification of the second embodiment.

FIG. 25A illustrates a relationship between horizontal distance (represented by the horizontal axis) and distance between the power transmitting coil 61 and the power receiving coil 71 (represented by the vertical axis), and a relationship between horizontal distance (represented by the horizontal axis) and angle between the power transmitting coil 61 and the power receiving coil 71 (represented by the vertical axis). FIG. 25B illustrates a relationship between horizontal distance (represented by the horizontal axis) and received power (represented by the vertical axis).

As can be seen from FIG. 25B, in the first modification of the second embodiment, the received power is in the range of 3 W to the maximum allowable received power when the horizontal distance is in the range of 0 mm to about 38 mm. The maximum allowable received power is, for example, 4.2 W.

The feeding surface of the power transmitting device 60a according to the first modification of the second embodiment has two steps, but may have three or more steps.

(Second Modification)

Figure 26:
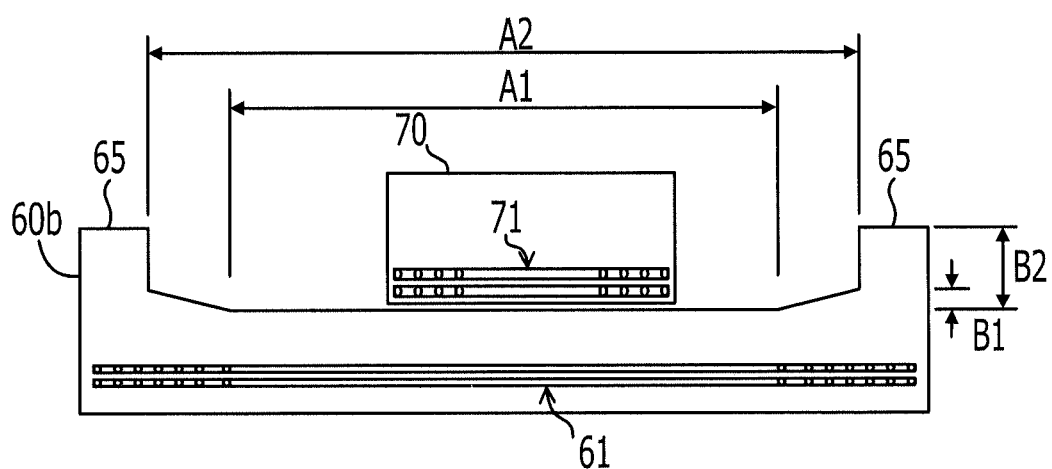
FIG. 26 illustrates a wireless power transmission system according to a second modification of the second embodiment.

FIG. 26 schematically illustrates a wireless power transmission system according to a second modification of the second embodiment. In FIG. 26, the same components as those illustrated in FIG. 19 are assigned the same reference numerals and their detailed description will be omitted.

In the second modification of the second embodiment, a feeding surface of a wireless power transmitting device (power transmitting device) 60b has a recessed portion, which has an inclined surface inclined downward toward the inside at the edge of the recessed portion. Referring to FIG. 26, a diameter A2 of the recessed portion of the feeding surface is 102 mm, and a diameter A1 of the bottom of the recessed portion is 82 mm. A height B1 of the top of the inclined surface is 3 mm, and a height B2 from the bottom of the recessed portion to the upper surface of the raised portion 65 is 14 mm. Note that the upper surface of the raised portion 65 is the edge of the feeding surface.

Figure 27A:
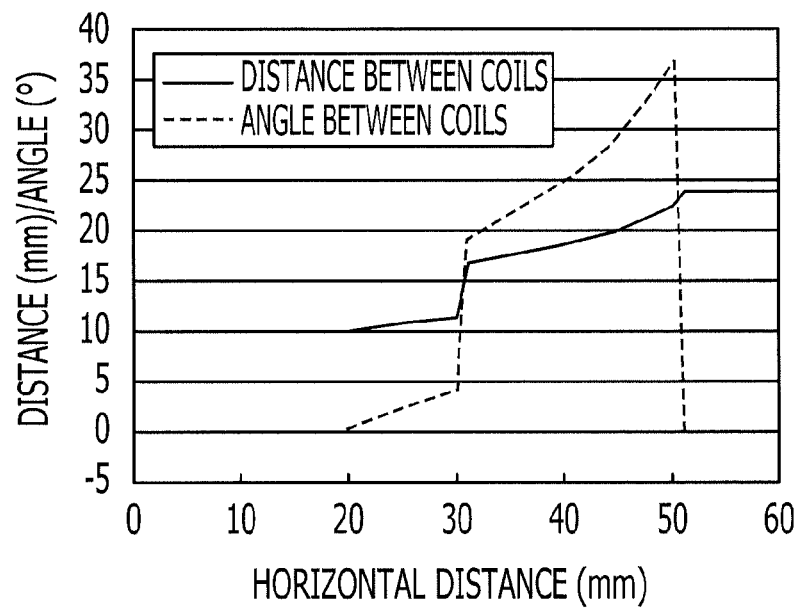
FIG. 27A illustrates a relationship between horizontal distance and distance between the power transmitting coil and the power receiving coil, and a relationship between horizontal distance and angle between the power transmitting coil and the power receiving coil.
Figure 27B:
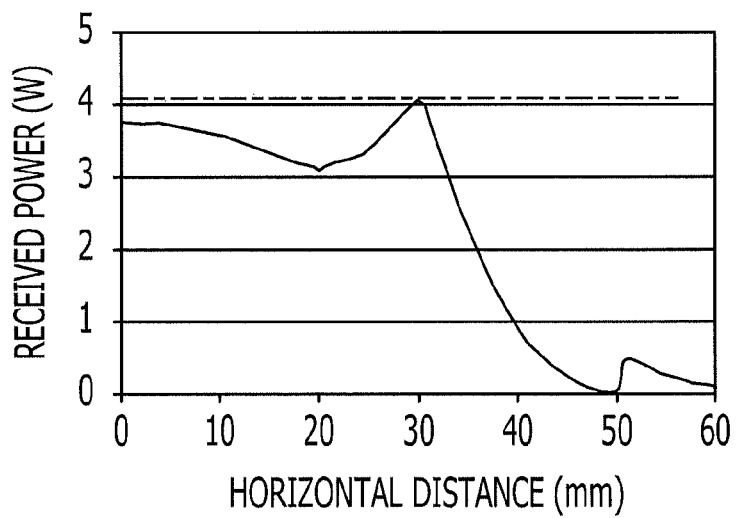
FIG. 27B illustrates a relationship between horizontal distance and received power, according to the second modification of the second embodiment.

FIG. 27A illustrates a relationship between horizontal distance (represented by the horizontal axis) and distance between the power transmitting coil 61 and the power receiving coil 71 (represented by the vertical axis), and a relationship between horizontal distance (represented by the horizontal axis) and angle between the power transmitting coil 61 and the power receiving coil 71 (represented by the vertical axis). FIG. 27B illustrates a relationship between horizontal distance (represented by the horizontal axis) and received power (represented by the vertical axis).

As can be seen from FIG. 27B, in the second modification of the second embodiment, the received power is in the range of 3 W to the maximum allowable received power when the horizontal distance is in the range of 0 mm to about 33 mm.

Third Embodiment

Figure 28:
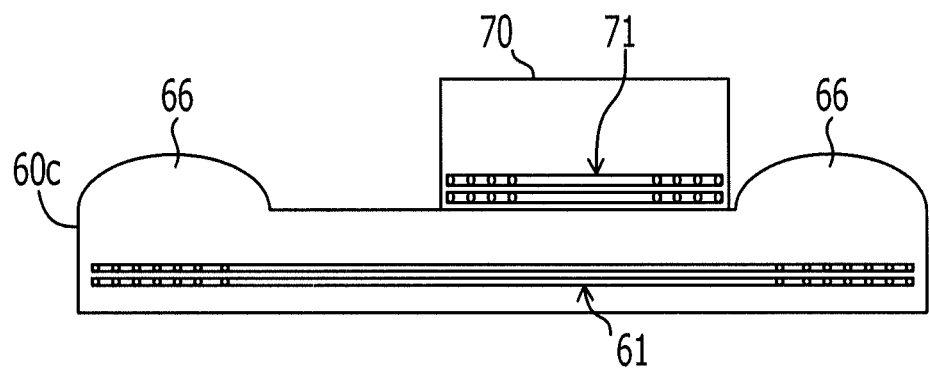
FIG. 28 illustrates a configuration of a wireless power transmitting device and a wireless power transmission system according to a third embodiment.

FIG. 28 illustrates a configuration of a wireless power transmitting device and a wireless power transmission system according to a third embodiment. In FIG. 28, the same components as those illustrated in FIG. 19 are assigned the same reference numerals and their detailed description will be omitted.

In the third embodiment, a feeding surface of a wireless power transmitting device (power transmitting device) 60c has a raised portion 66 at the edge thereof, that is, in an area where received power may exceed the maximum allowable received power. The raised portion 66 is arc-shaped in cross section.

The surface of the raised portion 66 is made of, for example, resin with a low friction coefficient. Even if the power receiving device 70 is attempted to be placed on the raised portion 66, the power receiving device 70 slides down the surface of the raised portion 66 by gravity and is placed on a recessed portion of the feeding surface. Thus, since the power receiving device 70 does not receive excess power, it is possible to suppress heat generation in the rechargeable battery and damage to the rectification circuit and the DC-DC converter. It is also possible to minimize a decrease from designed received power.

(First Modification)

Figure 29:
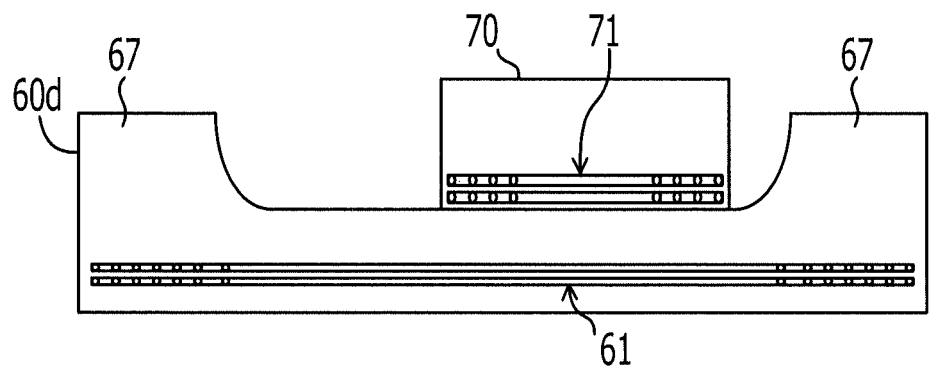
FIG. 29 illustrates a configuration of a wireless power transmitting device and a wireless power transmission system according to a first modification of the third embodiment.

FIG. 29 illustrates a configuration of a wireless power transmitting device and a wireless power transmission system according to a first modification of the third embodiment. In FIG. 29, the same components as those illustrated in FIG. 28 are assigned the same reference numerals and their detailed description will be omitted.

In the first modification of the third embodiment, a feeding surface of a wireless power transmitting device (power transmitting device) 60d has a raised portion 67 at the edge thereof, that is, in an area where received power may exceed the maximum allowable received power. An inner surface of the raised portion 67 adjacent to a recessed portion is shaped to follow a quadratic curve. The power receiving device 70 in contact with the inner surface of the raised portion 67 slides down to the recessed portion of the feeding surface due to instability. Thus, since the power receiving device 70 does not receive excess power, it is possible to suppress heat generation in the rechargeable battery and damage to the rectification circuit and the DC-DC converter. It is also possible to minimize a decrease from designed received power.

Fourth Embodiment

Figure 30:
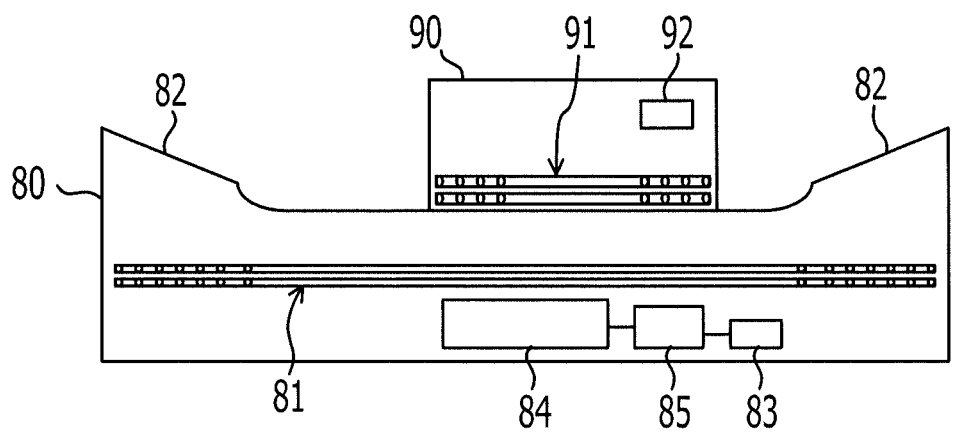
FIG. 30 illustrates a configuration of a wireless power transmitting device and a wireless power transmission system according to a fourth embodiment.

FIG. 30 illustrates a configuration of a wireless power transmitting device and a wireless power transmission system according to a fourth embodiment.

As illustrated in FIG. 30, a wireless power transmitting device (power transmitting device) 80 includes a power transmitting coil 81. As in the first embodiment, the power transmitting coil 81 includes a primary coil and a secondary coil. The power transmitting device 80 includes a communication unit 83, a vibrator 84, and a control unit 85.

A feeding surface of the power transmitting device 80 has a raised portion 82 at the edge thereof, that is, in an area where received power may exceed the maximum allowable received power. An upper surface of the raised portion 82 is an inclined surface inclined downward toward the center of the feeding surface. The inclined surface of the raised portion 82 is curved at the lower end thereof and leads to a flat portion at the bottom of the feeding surface.

A power receiving device 90 includes a power receiving coil 91. As in the first embodiment, the power receiving coil 91 includes a third coil and a fourth coil. The power receiving device 90 includes a communication unit 92 that communicates with the communication unit 83 of the power transmitting device 80. The communication unit 83 of the power transmitting device 80 and the communication unit 92 of the power receiving device 90 communicate with each other, for example, via Bluetooth.

In the fourth embodiment, when the power receiving device 90 is placed on the feeding surface of the power transmitting device 80, the communication unit 83 of the power transmitting device 80 and the communication unit 92 of the power receiving device 90 start communicating with each other. This allows the control unit 85 of the power transmitting device 80 to recognize that the power receiving device 90 has been placed on the feeding surface. Upon recognizing that the power receiving device 90 has been placed on the feeding surface, the control unit 85 operates the vibrator 84 for a certain period of time to vibrate the feeding surface of the power transmitting device 80. For example, the control unit 85 operates the vibrator 84 twice, for three seconds each time.

Figure 31:
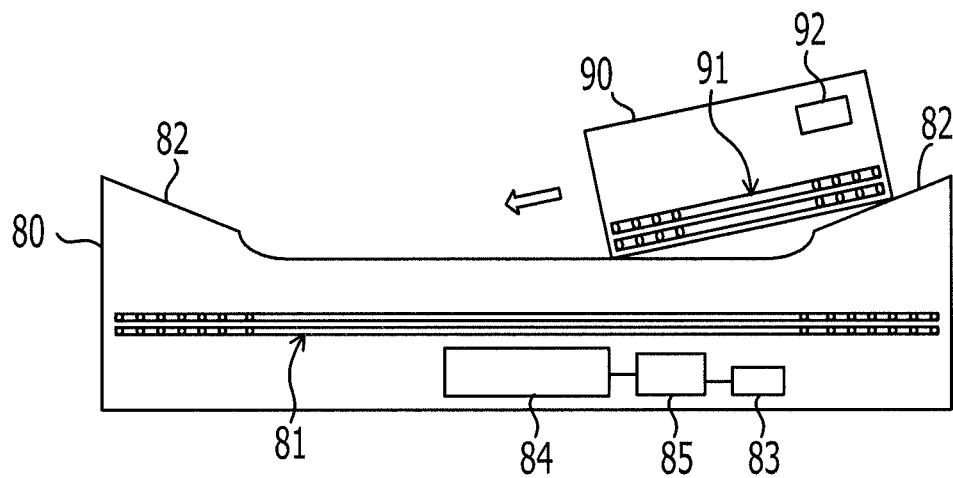
FIG. 31 illustrates an operation of the wireless power transmission system according to the fourth embodiment.

For example, when the power receiving device 90 is placed on the inclined surface of the raised portion 82 as illustrated in FIG. 31, the vibration of the power transmitting device 80 causes the power receiving device 90 to slide down the inclined surface and be placed at the bottom of the feeding surface as illustrated in FIG. 30. Thus, since the power receiving device 90 does not receive excess power, it is possible to suppress heat generation in a rechargeable battery and damage to a rectification circuit and a DC-DC converter. It is also possible to minimize a decrease from designed received power.

(First Modification)

Figure 32:
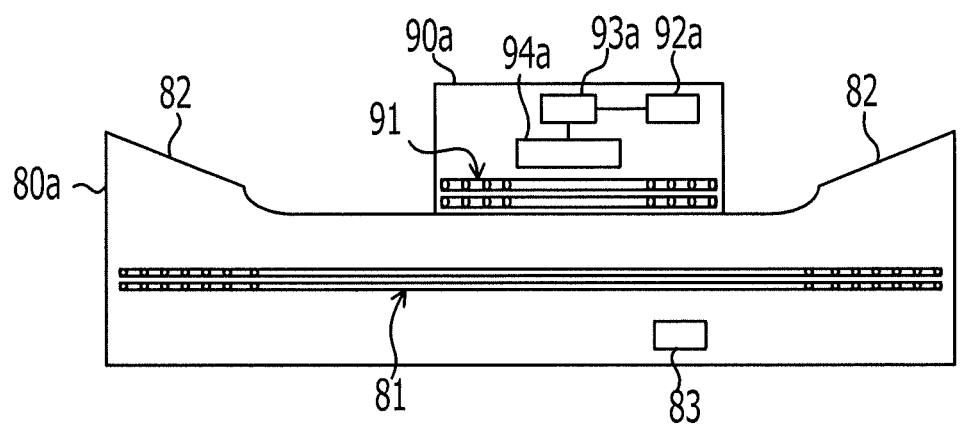
FIG. 32 illustrates, a wireless power transmission system according to a first modification of the fourth embodiment.

FIG. 32 schematically illustrates a wireless power transmission system according to a first modification of the fourth embodiment. In FIG. 32, the same components as those illustrated in FIG. 30 are assigned the same reference numerals and their detailed description will be omitted.

In the first modification of the fourth embodiment, a wireless power transmitting device (power transmitting device) 80a includes a communication unit 83a. A power receiving device 90a includes a communication unit 92a that communicates with the communication unit 83a of the power transmitting device 80a, a control unit 93a, and a vibrator 94a. If the power receiving device 90a is a mobile phone, a silent mode vibrator in the mobile phone may be used as the vibrator 94a.

When the power receiving device 90a is placed on the feeding surface of the power transmitting device 80a, the communication unit 83a of the power transmitting device 80a and the communication unit 92a of the power receiving device 90a start communicating with each other. This allows the control unit 93a of the power receiving device 90a to recognize that the power receiving device 90a has been placed on the feeding surface of the power transmitting device 80a. Upon recognizing that the power receiving device 90a has been placed on the feeding surface, the control unit 93a vibrates the vibrator 94a for a certain period of time.

Figure 33:
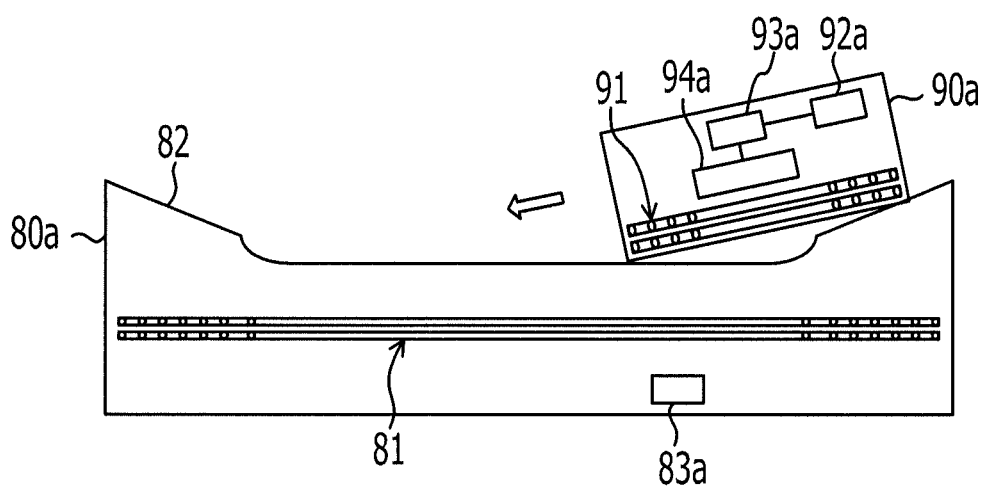
FIG. 33 illustrates an operation of the wireless power transmission system according to the first modification of the fourth embodiment.

For example, when the power receiving device 90a is placed on the inclined surface of the raised portion 82 as illustrated in FIG. 33, the vibration of the vibrator 94a causes the power receiving device 90a to slide down the inclined surface and be placed at the bottom of the feeding surface as illustrated in FIG. 32. Thus, since the power receiving device 90a does not receive excess power, it is possible to suppress heat generation in a rechargeable battery and damage to a rectification circuit and a DC-DC converter. It is also possible to minimize a decrease from designed received power.

In the fourth embodiment (or its first modification) described above, the power transmitting device 80 (or 80a) and the power receiving device 90 (or 90a) communicate with each other and allow the control unit 85 (or 93a) to recognize that the power receiving device 90 (or 90a) has been placed on the feeding surface of the power transmitting device 80 (or 80a). Alternatively, the control unit 85 (or 93a) may operate the vibrator 84 (or 94a) in response to an increase in current flowing through the power transmitting coil 81 and the power receiving coil 91 by magnetic field resonance that occurs when the power receiving device 90 (or 90a) is placed on the feeding surface of the power transmitting device 80 (or 80a).

For example, the control unit 85 (or 93a) may be configured to monitor the current flowing through the power transmitting coil 81 (or power receiving coil 91). Then, upon detecting an increase in current flowing through the power transmitting coil 81 (or power receiving coil 91), the control unit 85 (or 93a) determines that the power receiving device 90 (or 90a) has been placed on the feeding surface of the power transmitting device 80 (or 80a). Additionally, if the amount of current that flows through the power transmitting coil 81 (or power receiving coil 91) is smaller than a certain value, the control unit 85 (or 93a) operates the vibrator 84 (or 94a). Thus, the same effect as that of the embodiments described above may be achieved.

Mobile Phone

Figure 34:
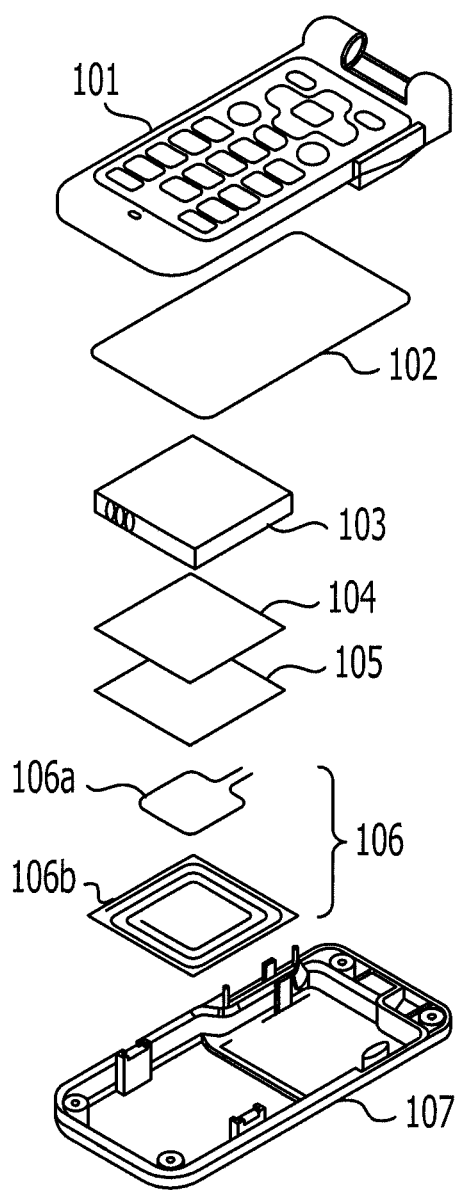
FIG. 34 illustrates a mobile phone serving as a power receiving device.

FIG. 34 illustrates a mobile phone serving as a power receiving device. The mobile phone includes an operation panel 101, a back cover 107, and other components therebetween. The other components include a substrate 102 having electronic parts mounted thereon, a battery 103, a shield plate 104, a magnetic sheet 105, and a power receiving coil 106 (including a fourth coil 106a and a third coil 106b) that are disposed in this order from the side of the operation panel 101.

It is preferable, as illustrated in FIG. 34, that the shield plate 104 and the magnetic sheet 105 be interposed between the power receiving coil 106 and the substrate 102 having electronic parts mounted thereon.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless power transmitting device of magnetic field resonance type, comprising:
    a housing configured to have a feeding surface on which a power receiving device is to be placed;
    a power transmitting coil disposed inside the housing and configured to have a central axis that intersects with the feeding surface; and
    an alternating-current power supply configured to supply power to the power transmitting coil,
    wherein the housing is further configured so as to change a distance between the feeding surface and the power transmitting coil according to an amount of power at a horizontal position of the power transmitting coil,
    wherein the feeding surface has raised and recessed portions by which a predetermined power is obtained from the power transmitting coil regardless of a point where the power receiving device is placed, the raised and recessed portions being disposed in an area directly above a region inside an outer region of the power transmitting coil, and
    wherein the raised and recessed portions are designed based on a curve formed by connecting points at which the predetermined power is obtained.

2. The wireless power transmitting device according to claim 1, wherein the power transmitting coil includes
    a primary coil to which an alternating current is supplied from the alternating-current power supply, and
    a secondary coil configured to form a resonant circuit and magnetically connected to the primary coil.

3. The wireless power transmitting device according to claim 1, wherein the power transmitting coil is a planar spiral coil.

4. The wireless power transmitting device according to claim 1, wherein- a raised portion of the raised and recessed portions is located above coil wires of the power transmitting coil.

5. The wireless power transmitting device according to claim 1 , wherein the feeding surface has an inclined portion located above coil wires of the power transmitting coil and inclined downward toward the outside of the transmitting coil.

6. The wireless power transmitting device according to claim 1, wherein the points are determined based on a relationship between received power and distance between the power transmitting coil and the power receiving coil.

7. A wireless power transmission system of magnetic field resonance type, comprising:
    a power transmitting device including
       a housing configured to have a feeding surface on which a power receiving device is to be placed, an alternating-current power supply, and a power transmitting coil to which power is supplied from the alternating-current power supply;

a power receiving device configured to be placed on the feeding surface of the power transmitting device, the power receiving device including a power receiving coil configured to resonate with a magnetic field produced by the power transmitting coil of the power transmitting device, wherein the housing is further configured so as to change a distance between the feeding surface and the power transmitting coil according to an amount of power at a horizontal position of the power transmitting coil, wherein the feeding surface has raised and recessed portions by which a predetermined power is obtained from the power transmitting coil regardless of a point where the power receiving device is placed, the raised and recessed portions being disposed in an area directly above a region inside an outer region of the power transmitting coil, and wherein the raised and recessed portions are designed based on a curve formed by connecting points at which the predetermined power is obtained.

8. The wireless power transmission system according to claim 7, wherein the power transmitting coil is larger in diameter than the power receiving coil.

9. The wireless power transmission system according to claim 7, wherein the power transmitting coil includes a primary coil to which power is supplied from the alternating-current power supply, and a secondary coil configured to form a resonant circuit and magnetically connected to the primary coil; and the power receiving coil includes a third coil configured to form a resonant circuit that resonates with a magnetic field produced by the secondary coil, and a fourth coil magnetically connected to the third coil.

10. The wireless power transmission system according to claim 7, wherein at least one of the power transmitting device and the power receiving device includes a vibrator that generates vibration when the power receiving device is placed on the feeding surface of the power transmitting device.

11. The wireless power transmission system according to claim 7, wherein the power transmitting coil is a planar spiral coil.

12. The wireless power transmission system according to claim 7, wherein a raised portion of the raised and recessed portions is located above coil wires of the power transmitting coil.

13. The wireless power transmission system according to claim 7, wherein the feeding surface has an inclined portion located above coil wires of the power transmitting coil and inclined downward toward the outside of the transmitting coil.

* * * * *